Nov. 23, 1954
F. R. McFARLAND
2,694,949
TRANSMISSION
Filed Nov. 1, 1950
2 Sheets-Sheet 1
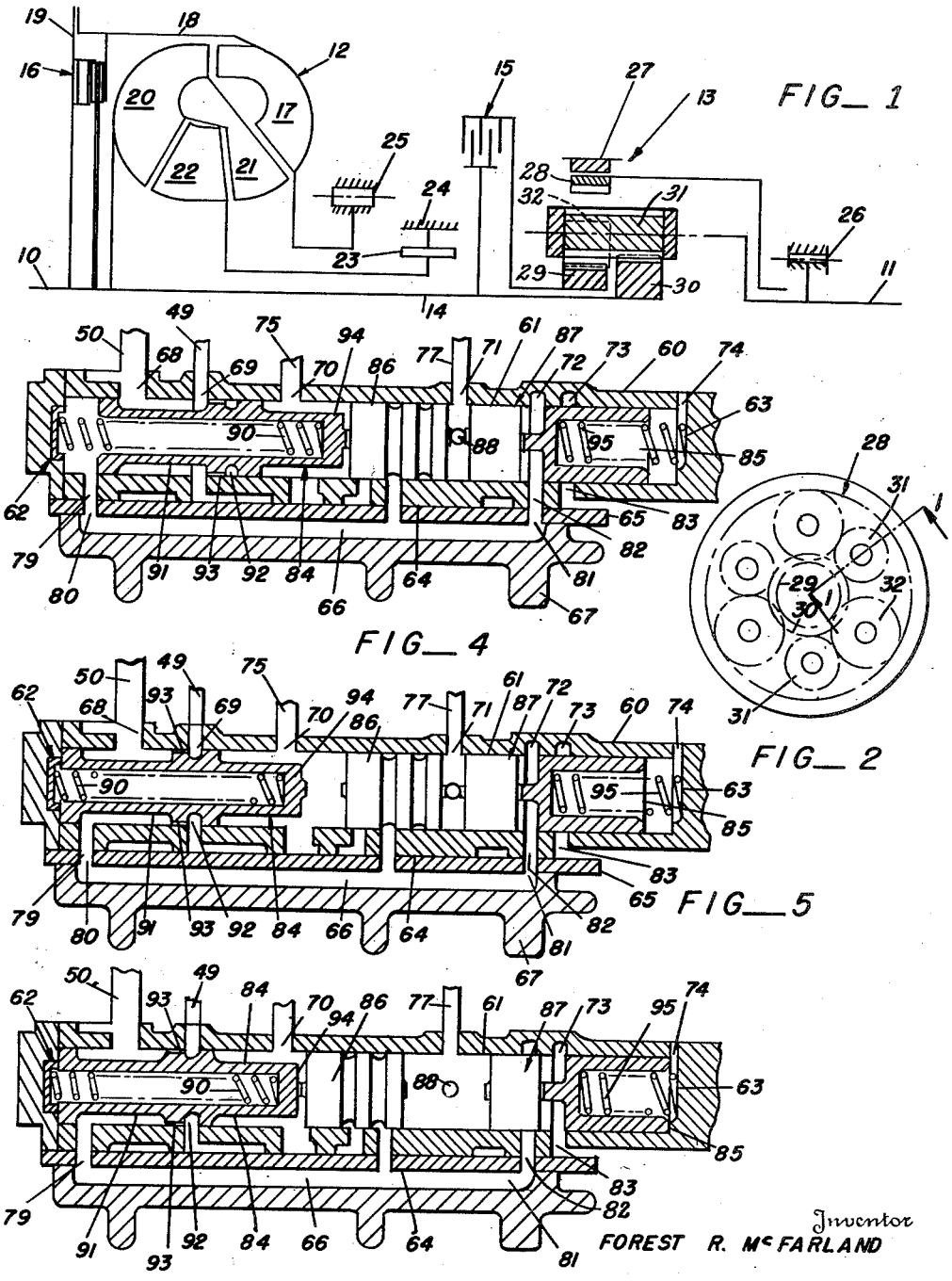
Inventor
FOREST R. McFARLAND
By Davis Lindsey Hibben & Noyes
Attorney Inventor
FOREST R. McFARLAND
By Davis Lindsey Hibben & Noyes
Attorney

United States Patent Office 2,694,949
Patented Nov. 23, 1954

2,694,949

TRANSMISSION

Forest R. McFarland, Huntington Woods, Mich., assignor to Packard Motor Car Company, Detroit, Mich., a corporation of Michigan Application November 1, 1950, Serial No. 193,451

12 Claims. (Cl. 74—732)

This invention relates to a control mechanism for an automatic transmission for an automotive vehicle and is an improvement on the control mechanism described in my co-pending application for United States patent, Serial No. 71,128, filed January 15, 1949. The transmission there described comprises a two speed and reverse transmission of the planetary type, with a hydraulic torque converter and connecting the transmission to the engine and a friction clutch for by-passing the converter at cruising speeds of the vehicle.

Among the features used in the aforementioned transmission is a combination of valves which function to admit fluid under pressure to the torque converter during low speed and reverse operations. Low speed and reverse operations are effected with the aid of hydraulically operated servo mechanisms which for ease of manufacture as well as simplicity of maintenance are made identical. Because of the greater torque reaction on the planetary transmission during reverse than in low, approximately twice the fluid pressure is required in the servo mechanism used to produce the necessary reaction in reverse. The fluid pressure in the converter, which derives its fluid from the same source as the reverse-producing servo mechanism, is consequently much higher than is necessary. The relatively large converter is more difficult to seal than a valve or similar small device and the increased pressure therefore increases the leakage in the converter and associated system, including the reverse-producing mechanism. Thus at times there may not be enough pressure during reverse operation to produce the proper reaction with a consequent increase in the load on the pump supplying the fluid under pressure and a possible heating and excessive wear of the reverse mechanism due to slippage.

The principal object of this invention is to provide an improved control mechanism for the transmission disclosed in the aforesaid application which automatically blocks off the major portion of the converter flow from the system hydraulically when it is operating in reverse so that the pressure required for reverse drive operation is not present in the converter, thereby assuring adequate pressure for reverse drive operation thereby permitting the use of a smaller pump than could be used if it were flowed through the converter, and reducing the danger of overheating of the reverse brake mechanism because of slippage.

Another object of this invention is to provide a control mechanism for the transmission disclosed in the aforesaid application wherein means are provided for regulating the maximum pressure in the converter during normal operation of the converter, and also during locked up direct drive operation of the transmission wherein the converter is substantially by-passed, with additional means, operated by the servomotor for effecting reverse drive operation for rendering the pressure regulating means inoperative during such reverse drive operation.

A still more specific object of this invention is to provide a plurality of valves for controlling the admission of fluid under pressure to a torque converter and for controlling the maximum pressure of the fluid in said converter, with hydraulically operated plungers for shifting the valves to positions in which the fluid under pressure is substantially cut off from the converter and also from a pressure relief valve used with the converter, the plungers in turn being operated as an incident to the operation of a servomotor in the transmission.

A still more specific object of this invention is to provide a plurality of control valves operating in a common bore, one valve being located at one end of the bore and serving to control the admission of fluid to a hydraulic torque converter or the like and another valve being located in the opposite end of the bore and serving to regulate the maximum pressure in the converter, and a pair of piston type plungers between the two valves separated by an abutment located between the plungers, with means for admitting fluid between the plungers under certain conditions whereby to cause the plungers to move the valves to inoperative positions.

These and other objects of this invention will become apparent from the following description when taken together with the accompanying drawings, in which Fig. 1 is a schematic diagram of a transmission to which this invention may be applied;

Fig. 2 is a schematic diagram of the gearing used in the transmission shown in Fig. 1;

Figs. 4, 5 and 6 are sections through the valve mechanism used to control the admission of fluid to the converter, and to control the maximum pressure developed in said converter.

Figure 3:
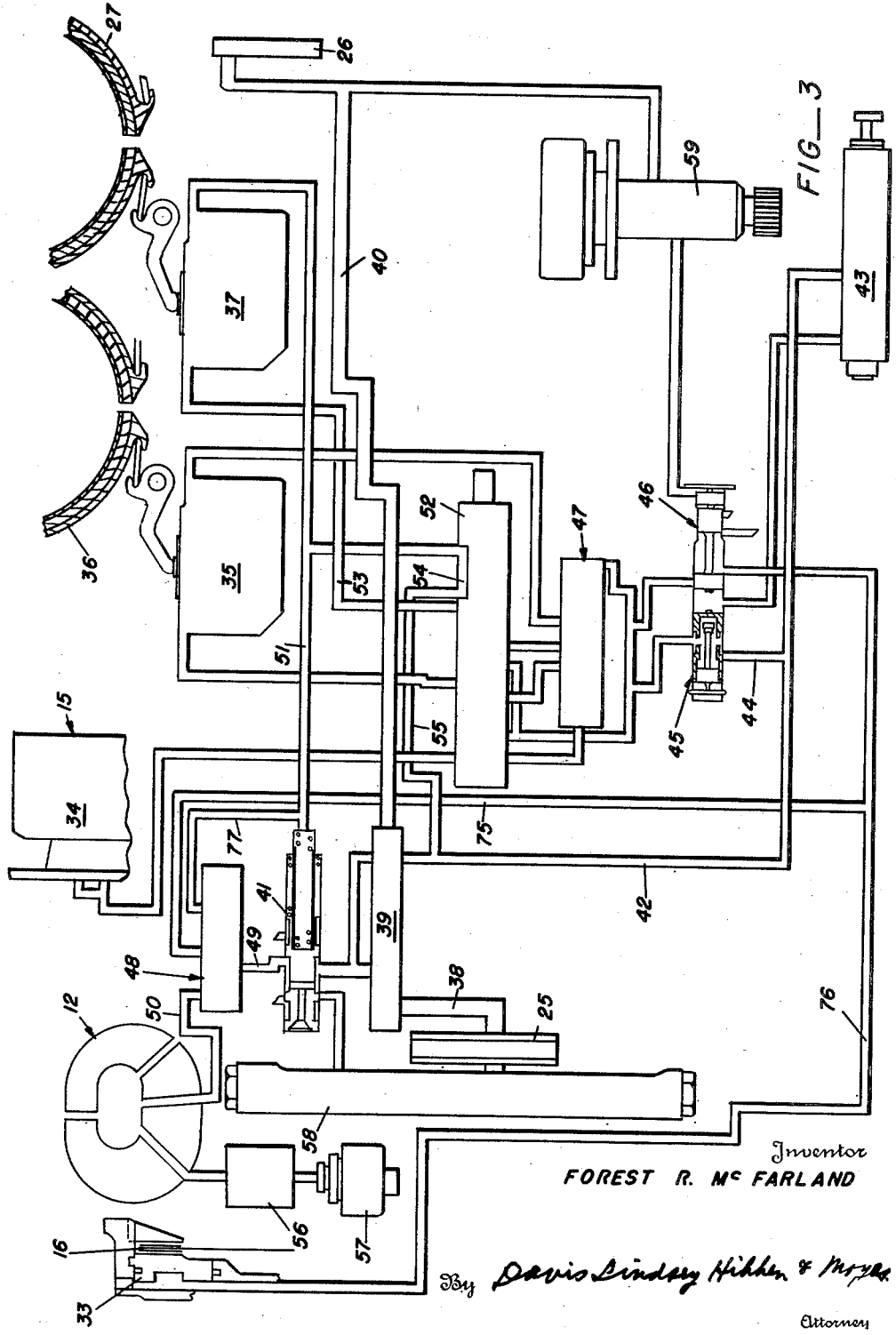
Fig. 3 is a schematic diagram of the hydraulic devices and circuits used to control the transmission shown in Fig. 1.

Referring now to Fig. 1 for a brief description of the transmission to which this invention may be applied, there is shown a drive shaft 10, a driven or output shaft 11, a torque converter 12 of the vaned closed-circuit type, a planetary gear set 13, an intermediate shaft 14 connecting the converter to the planetary gear set, a multiple plate friction clutch 15 adapted to connect two elements of the planetary gear set 13 together for direct drive operation, and a friction clutch 16 used to connect the drive shaft 10 directly to intermediate shaft 14 to by-pass converter 12. Said converter 12 is comprised of a pump member 17, connected through housing 18 to the flywheel 19 of the engine, the flywheel being driven directly from drive shaft 10. The fluid energized by pump 17 operates upon a turbine member having two stages 20 and 21 and is redirected by a stationary or stator element 22 interposed between stages 20 and 21 of the turbine member. Said turbine member is connected to intermediate shaft 14 and is rotatable therewith. Stator 22 is connected through a one-way coupling device 23 to the housing 24 of the transmission, and pump element 17 is connected to, and drives a pump 25, which supplies fluid under pressure to the converter and to the other hydraulically operated devices associated with the transmission. A second fluid pressure pump 26 is driven by output shaft 11 and functions whenever the vehicle in which the transmission is installed is in motion. A brake 27 of the friction type is adapted to be applied to the ring gear 28 (Fig. 2) of the planetary gear set and, due to the arrangement of planet and sun gears in the set, a reverse drive is produced in output shaft 11 when brake 27 is so applied.

Planetary gear set 13 is comprised of two sun gears 29 and 30, see Figure 2, both of which are mounted concentric to intermediate shaft 14, sun gear 30 being splined to the shaft and serving to drive the remaining gears in the set, while sun gear 29 is free to rotate about said shaft 14. The planet gears are comprised of three long pinions 31 driven by sun gear 30, the pinions 31 in turn meshing with three short pinions 32 which mesh with ring gear 28. Clutch 15 is operative to lock sun gear 29 to sun gear 30 and thereby serves to lock the planetary gear set 13 together for one-to-one or direct drive.

Referring now to Fig. 3, the hydraulic devices for operating the various members of the transmission shown in Fig. 1 are comprised of an annular piston 33 which controls the operation of clutch 16 for by-passing converter 12, a piston 34, shown only in outline, for operating direct drive clutch 15, a servomotor 35 for operating a brake band 36 which may be applied to form of a pin 88 which is aligned with port 71 normal to bore 61 to allow fluid to flow from port 71 to the space between plungers 86 and 87.

Valve 84 is hollow to receive a spring 90 which is compressed between plate 62 and the valve 84 to urge said valve to the right as viewed in Figs. 4, 5 and 6. Said valve 84 is formed with a relatively wide peripheral groove 91 and a relatively narrow peripheral groove 92, with one or more bleed grooves 93 connecting the peripheral grooves 91 and 92. The right-hand end 94 of valve 84 as viewed in Figs. 4, 5 and 6 is of reduced diameter to allow fluid to flow around the valve to the space between valve 84 and the adjacent plunger 86.

In the position shown in Fig. 4, valve 84 connects port 69 with port 68 and hence admits fluid under pressure to conduit 50 and into converter 12. Valve 85 is constantly urged to the left as viewed in Fig. 4 by a spring 95 which is compressed between valve 85 and valve body 60.

When clutch 16 is operated, converter 12 is inoperative as described above and hence it is no longer necessary to maintain operating pressure in the fluid in converter 12. The operation of clutch 16 is effected by admitting fluid under pressure to conduit 76 which in turn admits fluid under the same pressure to conduit 75, port 70 and the space between plunger 86 and valve 84. This pressure holds plunger 86 against pin 88 and then moves valve 84 against the action of spring 90 to the left until it reaches the position shown in Fig. 5, i. e., until valve 84 abuts on plate 62. In this position port 69 is blocked to considerably reduce flow of fluid under pressure to the converter. The presence of peripheral grooves 92 and bleed grooves 93 results in a predetermined leakage of fluid into the converter when valve 84 is in the position shown in Fig. 5, the leakage being just sufficient to maintain a desired operating pressure in the converter. Should the pressure in the converter increase, it will be limited by relief valve 85 which remains effective under these conditions.

When manual selector valve 52 is operated to condition the system for reverse drive (Fig. 6) fluid under greatly increased pressure is admitted from pump check valve 39 through conduit 55, groove 54 in manual selector valve 52, conduits 53 and 51 to servomotor 37. From conduit 51, fluid at said greatly increased pressure is also fed through conduit 77 and port 71 to the space between plungers 86 and 87. This causes the said plungers 86 and 87 to separate, plunger 86 moving valve 84 to its extreme left-hand position as shown in Fig. 6, which is the same position it occupies under direct drive operation or when clutch 16 is in operation. Under reverse drive conditions, the pressure of the fluid at port 69 is the same as in servomotor 37 which, as stated previously, is undesirable. The movement of valve 84 to its left-hand position therefore blocks the passage of the high pressure fluid from port 69 to port 68 and the converter, except for whatever fluid is bled into the converter through grooves 92 and 93.

Relief valve 85 under reverse drive conditions is moved to the right as viewed in Fig. 6 by plunger 87 to the end of bore 61. This movement completely uncovers vent port 83, but port 82 is completely covered by plunger 87, and hence relief valve 85 is ineffective to control the pressure in the converter. Valve 84 would normally be in its right-hand position due to the action of spring 90 and the absence of counteracting fluid under pressure in conduit 75 and port 70, but the high fluid pressure in the space between plungers 86 and 87 causes plunger 86 to move to the left as viewed in Fig. 6, thereby moving valve 84 to the same position it occupies when clutch 16 is engaged as shown in Fig. 5. Valve 84 thus closes off port 69 and the high fluid pressure used to operate reverse servomotor 37 except for whatever fluid finds its way through bleed openings 93 to maintain adequate flow and pressure of the fluid for this condition. Since the fluid pressure in the converter is thus reduced to less than that required for forward converter drive, the loss of fluid in the converter through leakage is greatly decreased and hence sufficient pressure is available to operate the servomotor.

Thus the valves shown in Figs. 4, 5 and 6 function in the aforementioned transmission to provide fluid pressure in the converter when necessary and to regulate the maximum pressure in the converter when the converter is operating in forward drive, and to cut off the converter from its normal fluid pressure source when the converter is being by-passed and during reverse drive operation of the transmission.

It is understood that the foregoing description is illustrative of preferred embodiments of this invention and that the scope of the invention is not to be limited thereto, but is to be determined by the appended claims.

What is claimed is:

1. A control mechanism for a change speed power transmitting device, said device including a hydraulic torque converter and a hydraulically operated servomotor for operating a portion of the change speed mechanism, means for supplying fluid under pressure to both the converter and the servomotor, a first valve means and an associated conduit connecting the fluid supply means to the servomotor, a second valve means and an associated conduit connecting the fluid supply means to the converter, said last-mentioned valve means being movable between a fully open position wherein fluid pressure from the supply means is admitted substantially undiminished in pressure to the converter and a partially closed position wherein fluid pressure from the supply means is admitted diminished in pressure to the converter, and separately movable means responsive to fluid pressure in the servomotor for cooperating with the second valve means for moving said last-mentioned valve means to its partially closed position.

2. A control mechanism for a change speed power transmitting device, said device including a hydraulic torque converter and a hydraulically operated servomotor for operating a portion of the change speed mechanism, means for supplying fluid under pressure to both the converter and the servomotor, valve means and an associated conduit connecting the fluid supply means to the servomotor, valve means movable between a fully opened position and a partially opened position and an associated conduit connecting the fluid supply means to the converter, a pressure regulating valve connected to the converter to limit the fluid pressure in said converter, means responsive to fluid pressure in the servomotor and connected to the valve means associated with the conduit connecting the fluid supply means to the converter for moving said last mentioned valve means to its partially closed position, and other means responsive to fluid pressure in the servomotor for rendering the pressure regulating valve inoperable to relieve fluid pressure in the converter.

3. A control mechanism for a change speed power transmitting device, said device including a hydraulic torque converter and a hydraulically operated servomotor for operating a portion of the change speed mechanism, means for supplying fluid under pressure to both the converter and the servomotor, valve means and an associated conduit connecting the fluid supply means to the servomotor, valve means movable between a fully opened position and a partially opened position and an associated conduit connecting the fluid supply means to the converter, a pressure regulating valve connected to the converter to limit the fluid pressure in said converter, means responsive to fluid pressure in the servomotor and connected to the valve means associated with the conduit connecting the fluid supply means to the converter for moving said last-mentioned valve means to its partially closed position, and other means, operable in response to fluid pressure in the servomotor to block the connection between the converter and the relief valve.

4. A control mechanism for a change speed power transmitting device, said device including a hydraulic torque converter adapted to be filled with fluid under predetermined pressure and a hydraulically operated servomotor adapted to be operated by fluid under substantially greater pressure than the fluid pressure in the converter, means for supplying fluid under pressure to both the converter and the servomotor, a valve means including a block having a bore therein, a piston valve in the end of the bore movable between a fully opened position and a partially opened position and a conduit associated with the valve means for connecting the fluid supply means to the converter, a pressure regulating valve in the other end of said bore and connected to the converter to limit the fluid pressure in said converter, a pair of spaced plungers in said bore intermediate the piston valve and the pressure regulating valve, and means hydraulically connecting the space between the plungers to the servomotor such that the fluid in the said space will be substantially the same as the fluid pressure in the servomotor, said plungers being adapted to contact the piston valve and the pressure relief valve to move said valves to their partially closed and inoperative positions, respectively, when the servomotor is operated.

5. A control mechanism for a change speed power transmitting device, said device including a hydraulic torque converter adapted to be filled with fluid under predetermined pressure, fluid operated means for by-passing the flow of power around the converter, and a hydraulically operated servomotor adapted to be operated by fluid under substantially greater pressure than the fluid pressure in the converter, means for supplying fluid under pressure to the converter, to the by-pass means and to the servomotor; a valve means including a block having a bore therein, a piston valve in the bore movable between a fully opened position and a position corresponding to a closed position and a conduit associated with the valve means for connecting the fluid supply means to the converter, said valve means having a bleed opening therein to connect the fluid supply means to the converter in the said closed position of the valve to make up for normal leakage of fluid out of the converter, a pressure regulating valve having open and closed positions, said pressure regulating valve being located in the other end of the bore and connected to the converter in its open position to limit the fluid pressure in the converter, means hydraulically connecting the piston valve to the fluid operated means for by-passing the converter whereby to move the piston valve to its inoperative position, and means hydraulically connecting the piston valve and the pressure regulating valve to the servomotor and adapted to move the piston valve to its inoperative position and also to move the pressure regulating valve to its closed position to prevent flow of fluid from the converter through the pressure relief valve.

6. A control mechanism for a change speed power transmitting device, said device including a hydraulic torque converter adapted to be filled with fluid under predetermined pressure, fluid operated means for by-passing the flow of power around the converter, and a hydraulically operated servomotor adapted to be operated by fluid under substantially greater pressure than the fluid pressure in the converter, means for supplying fluid under pressure to the converter, the by-pass means and the servomotor; a valve means including associated conduits and a block having a bore therein, a piston valve in one end of the bore and movable between a fully opened position in which the fluid supply means is connected to the converter, and a position corresponding to a closed position, a pressure regulating valve in the other end of the bore and an associated conduit by which it is connected to the converter the valve serving to limit the fluid pressure in the converter, a pair of plungers in the bore intermediate the piston valve and the pressure regulating valve, the plunger adjacent the pressure regulating valve being movable to a position in which it blocks the conduit forming the connection between the converter and said pressure regulating valve, an abutment between the plungers, means for introducing fluid under pressure between the piston valve and the plunger adjacent thereto when the by-pass means is operated whereby to move the piston valve to its closed position, and means for introducing fluid under pressure between the plungers when the servomotor is operated, whereby to move the piston valve to its closed position by the plunger adjacent the piston valve and to move the plunger adjacent the pressure regulating valve to block the conduit forming the connection between the converter and the pressure regulating valve.

7. A control mechanism for a change speed power transmitting device, said device including a hydraulic torque converter adapted to be filled with fluid under predetermined pressure, fluid operated means for by-passing the power around the converter, and a hydraulically operated servomotor adapted to be operated by fluid under substantially greater pressure than the fluid pressure in the converter, means for supplying fluid under pressure to the converter, to the by-pass means and to the servomotor, a valve means and associated conduits, said valve means including a block having a bore therein, a piston valve in one end of the bore and movable between a fully opened position wherein the fluid supplying means is connected to the converter and a position corresponding to a closed position, a pressure regulating valve in the other end of the bore, said block having a passageway connecting the pressure regulating valve to the fluid supply for the converter, a pair of fluid pressure operated plungers in the bore intermediate the piston valve and the pressure regulating valve, the said passageway terminating between the pressure regulating valve and the plunger adjacent thereto and being adapted to be closed by the said adjacent plunger, a pin passing through the bore between the plungers and acting as an abutment for the plungers, said valve block having a port located between the plungers and connected to the servomotor such that substantially the same pressure obtains in the space between the plungers and in the servomotor, and means for introducing fluid under pressure between the piston valve and the plunger adjacent thereto when the by-pass means is operated, whereby to move the piston valve to its closed position whenever either the servo motor or the by-pass means is operated and to close the passageway to the pressure regulating valve when the servomotor is operated.

8. A control mechanism as described in claim 7, said piston valve having a bleed opening connecting the fluid supply means to the converter when the valve is in the position corresponding to a closed position, whereby to allow fluid to enter the converter to make up for any fluid escaping from the converter.

9. A control mechanism as described in claim 7, and resilient means urging the piston valve and the pressure regulating valve toward their respective plungers, and the plungers against the pin.

10. A control mechanism as described in claim 7, said pin being axially aligned with the port between the plungers so as to prevent the plungers from covering the port and thus allowing fluid to pass from said port to the space between the plungers at all times.

11. A control mechanism for a change speed power transmitting device, said device including a hydraulic torque converter and a hydraulically operated servomotor for operating a portion of the change speed mechanism, means for supplying fluid under pressure to both the converter and the servomotor, a first valve means and an associated conduit connecting the fluid supply means to the servomotor, a second valve means including means for operating it and an associated conduit connecting the fluid supply means to the converter, said last-mentioned valve means being arranged to be movable between a fully open position wherein fluid pressure from the supply means is admitted substantially undiminished in pressure to the converter and a partially closed position wherein fluid pressure from the supply means is admitted diminished in pressure to the converter, and said means for operating the valve being separately movable in response to fluid pressure in the servomotor for driving said second valve means to its partially closed position.

12. A control mechanism for a change speed power transmitting device, said device including a hydraulic torque converter and a hydraulically operated servomotor for operating a portion of the change speed mechanism, means for supplying fluid under pressure to both the converter and the servomotor, a first valve means and an associated conduit connecting the fluid supply means to the servomotor, a second valve means and an associated conduit connecting the fluid supply means to the converter, said last-mentioned valve means being adapted to be moved between a fully open position wherein fluid pressure from the supply means is admitted substantially undiminished in pressure to the converter and a partially closed position wherein fluid pressure from the supply means is admitted diminished in pressure to the converter, and a separately movable means cooperating with said last mentioned valve and responsive to fluid pressure in the servomotor for setting said last-mentioned valve means in its partially closed position.

References Cited in the file of this patent

FOREIGN PATENTS

| Number | Country | Date |
|---|---|---|
| 974,256 | France | Sept. 27, 1950 |

OTHER REFERENCES

Automotive Industries, Dec. 15, 1949.
Packard Serviceman's Training Book, Packard Motor Car Co., Detroit, Mich., June 14, 1949.